United States Patent
Hosoi et al.

(10) Patent No.: US 10,288,503 B2
(45) Date of Patent: May 14, 2019

(54) SURFACE PRESSURE MEASURING DEVICE

(71) Applicant: TOYOTA JIDOSHA KABUSHIKI KAISHA, Toyota-shi, Aichi-ken (JP)

(72) Inventors: Tsutomu Hosoi, Nagoya (JP); Ryotaro Okamoto, Obu (JP); Takahiro Fukuda, Anjo (JP); Shinichi Miura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/664,191

(22) Filed: Jul. 31, 2017

(65) Prior Publication Data

US 2018/0038749 A1  Feb. 8, 2018

(30) Foreign Application Priority Data

Aug. 3, 2016 (JP) ................................ 2016-153066

(51) Int. Cl.
| | |
|---|---|
| *G01B 5/20* | (2006.01) |
| *G01B 5/008* | (2006.01) |
| *G01M 11/02* | (2006.01) |
| *G01B 5/252* | (2006.01) |
| *G01L 5/00* | (2006.01) |
| *G01B 11/14* | (2006.01) |

(52) U.S. Cl.
CPC ............ *G01L 5/0038* (2013.01); *G01B 11/14* (2013.01)

(58) Field of Classification Search
CPC .......... G01B 5/008; G01B 5/252; G01B 5/20; G01B 21/04; G01B 7/012; G01B 11/007; G01B 17/00; G01M 11/025; G05B 19/4093; G05B 2219/35128; Y02P 90/265
See application file for complete search history.

(56) References Cited

U.S. PATENT DOCUMENTS

| | | | | |
|---|---|---|---|---|
| 5,189,806 A | * | 3/1993 | McMurtry | ............. G01B 21/04 33/503 |
| 6,158,136 A | * | 12/2000 | Gotz | ...................... G01B 3/008 33/503 |
| 6,675,637 B2 | * | 1/2004 | Saito | ...................... B82Y 35/00 73/104 |

(Continued)

FOREIGN PATENT DOCUMENTS

| | | |
|---|---|---|
| JP | 2000-501842 A | 2/2000 |
| JP | 2009-068991 A | 4/2009 |

(Continued)

*Primary Examiner* — Lisa M Caputo
*Assistant Examiner* — Brandi N Hopkins
(74) *Attorney, Agent, or Firm* — Sughrue Mion, PLLC

(57) ABSTRACT

A surface pressure measuring device includes an abutting plate, a lift, a probe, a piezo actuator and a controller. A pinhole is formed in the abutting plate at an abutting surface that abuts a target. The lift causes the target to abut the abutting surface such that the target is compressed to a predetermined thickness. The probe is inserted through the pinhole to be movable in an axial direction of the pinhole. The piezo actuator holds a state in which a tip surface is flush with the abutting surface as the probe resists a repulsive force received from the target while the lift causes the target to abut the abutting surface. The controller calculates a local surface pressure of the target from a load applied to the probe and an area of the tip surface of the probe.

7 Claims, 5 Drawing Sheets

(56) References Cited

U.S. PATENT DOCUMENTS

| | | | | |
|---|---|---|---|---|
| 7,681,432 | B2* | 3/2010 | Hay | G01B 3/008 |
| | | | | 73/1.79 |
| 7,681,459 | B1* | 3/2010 | Yang | G01N 3/08 |
| | | | | 73/760 |
| 9,285,201 | B2* | 3/2016 | Matsumiya | G01B 7/34 |
| 2009/0299692 | A1* | 12/2009 | Yoshizumi | G01B 5/008 |
| | | | | 702/168 |
| 2010/0000307 | A1* | 1/2010 | Igasaki | G01B 3/008 |
| | | | | 73/105 |
| 2015/0362525 | A1* | 12/2015 | Amemiya | G01Q 20/04 |
| | | | | 850/40 |

FOREIGN PATENT DOCUMENTS

| | | |
|---|---|---|
| JP | 2012-021924 A | 2/2012 |
| JP | 2014-185990 A | 10/2014 |
| WO | 97/22845 A1 | 6/1997 |

* cited by examiner

SURFACE PRESSURE MEASURING DEVICE

INCORPORATION BY REFERENCE

The disclosure of Japanese Patent Application No. 2016-153066 filed on Aug. 3, 2016 including the specification, drawings and abstract is incorporated herein by reference in its entirety.

BACKGROUND

1. Technical Field

The present disclosure relates to a surface pressure measuring device.

2. Description of Related Art

Measurement of a local surface pressure of a target surface when a predetermined load is applied to a target or the target is compressed to a predetermined thickness is needed. For example, in some cases, a surface pressure in a predetermined local portion of a gasket when the gasket formed of rubber is compressed to a predetermined thickness may be measured. Devices configured to measure a surface pressure of a target are disclosed in, for example, Japanese Patent Application Publication No. 2009-68991 (JP 2009-68991 A) and Japanese Patent Application Publication No. 2012-21924 (JP 2012-21924 A).

The surface pressure measuring device in JP 2009-68991 A includes a sheet having a plurality of convex sections, and a pressure measuring material that develops a color upon receiving pressure. The color of the pressure measuring material varies according to a magnitude of the pressure. In the surface pressure measuring device, a pressure measuring material is affixed to apex surfaces of the plurality of convex sections of the sheet and the sheet is attached to a target. A surface pressure applied to each convex section is determined according to the color of the pressure measuring member. In the surface pressure measuring device in JP 2012-21924 A, a plurality of probes are disposed in a two-dimensional array such that tips thereof form a planar surface. A target is pressed against the tips of the plurality of probes. The surface pressure measuring device in JP 2012-21924 A can obtain a surface pressure distribution of the surface of the target from the load applied to the probes.

SUMMARY

In the surface pressure measuring device in JP 2009-68991 A, a certain area is required for a pressure measuring material, and it is not suitable for measuring an extremely small local surface pressure of the surface of the target. In the surface pressure measuring device in JP 2012-21924 A, a plurality of probes are disposed in a two-dimensional array. Position resolution when the surface pressure distribution is measured depends on a diameter of the probe. For example, in measuring the surface pressure distribution at a resolution of tens of microns, the plurality of probes having a diameter of tens of microns should be densely disposed in a two-dimensional array. Accordingly, the surface pressure measuring device in JP 2012-21924 A is not suitable for measuring an extremely small local surface pressure of the surface of the target. When only one probe of the surface pressure measuring device in JP 2012-21924 A is used, since a load applied to the entire target is the load applied to the probe, a local surface pressure when the entire target is compressed to a predetermined thickness cannot be measured. The technology disclosed herein discloses a surface pressure measuring device capable of measuring an extremely small local surface pressure of a target surface when a predetermined load is applied to a target or the target is compressed to a predetermined thickness.

A surface pressure measuring device disclosed herein includes an abutting plate that abuts a target, a first actuator, a second actuator, a probe, a load sensor and a controller. The abutting plate has an abutting surface that abuts the target, and a hole is in the abutting surface. The first actuator is configured to cause the target to abut the abutting surface with a predetermined load. Alternatively, the first actuator is configured to cause the target to abut the abutting surface such that the target is compressed to a predetermined thickness. The probe has the tip surface that is exposed at the abutting surface side and is configured to be inserted through the hole to be movable in an axial direction thereof. The second actuator supports the probe. The second actuator is configured to hold a state in which the tip surface of the probe is flush with the abutting surface as the probe resists a repulsive force received from the target while the first actuator causes the target to abut the abutting surface. The load sensor is configured to measure a load applied to the probe when the second actuator holds the state in which the tip surface of the probe is flush with the abutting surface. The controller is configured to calculate a surface pressure applied to the tip surface of the probe from a measured value of the load sensor and an area of the tip surface of the probe. The surface pressure is a local surface pressure of a place that abuts the probe of the target.

In the above-mentioned surface pressure measuring device, the tip surface of the probe exposed from the hole is flush with the abutting surface of the abutting plate. The controller measures a surface pressure of a place that abuts the tip surface of the probe while the abutting surface of the abutting plate including the tip surface of the probe applies the load to the entire target. The above-mentioned surface pressure measuring device can measure a surface pressure of a local place that abuts the tip surface of the probe when the abutting plate applies a predetermined load to the entire target (or the entire target is compressed to a predetermined thickness). As a diameter of the hole of the abutting plate and an area of the tip surface of the probe are reduced, an extremely small local surface pressure of the target surface can be measured.

Further, precision of "flushness" between the tip surface of the probe and the abutting surface depends on required measurement precision of the surface pressure. As the required measurement precision of the surface pressure is increased, an allowable error in a degree of "flushness" between the tip surface of the probe and the abutting surface is reduced.

The surface pressure measuring device disclosed herein may further include a third actuator configured to move the abutting plate relative to the target to change a place at which the target abuts the probe. In this case, the controller calculates the surface pressure at a plurality of places of the target and outputs a surface pressure distribution of the target. In the surface pressure measuring device including the third actuator, a size of the tip surface of the probe and movement resolution of the probe determine a resolution (a position resolution) of surface pressure distribution measurement. For example, when the tip surface of the probe is a circle having a diameter of 10 microns and the movement resolution of the probe of the third actuator is 10 microns, the surface pressure measuring device has a position resolution of 10 microns. The surface pressure measuring device disclosed herein can measure the surface pressure distribution with a high position resolution.

The probe may include a tip and an intermediate section thicker than the tip. In this case, the hole formed in the abutting plate may include a small diameter section through which the tip of the probe is inserted, and a large diameter section having a diameter larger than that of the small diameter section and through which the intermediate section is inserted. A strong probe can be realized while setting the tip surface as a small area. In the surface pressure measuring device disclosed herein, like the device in JP 2012-21924 A, there is no need to densely dispose a plurality of probes. Therefore, a probe in which only a tip is thin and a connecting portion (an intermediate section) is thick may be employed. Then, as the intermediate section is fitted into the large diameter section of the hole, the probe can be supported by the intermediate section having a large diameter.

The above-mentioned surface pressure measuring device may further include a first laser range finder configured to measure a position of the hole of the probe in the axial direction. In addition, the controller may store a position of the hole of the probe in the axial direction when the tip surface is flush with the abutting surface, and control the second actuator such that the tip surface is flush with the abutting surface based on measurement data of the first laser range finder.

The above-mentioned surface pressure measuring device may further include a placing table placed on the target. In addition, the first actuator may be configured to move the placing table.

The above-mentioned surface pressure measuring device may further include a second laser range finder installed on the placing table and configured to measure a distance between the placing table and the abutting plate. In addition, the controller may acquire measurement data measured by the second laser range finder and control the first actuator to change the distance between the placing table and the abutting plate based on the measurement data measured by the second laser range finder.

In the above-mentioned surface pressure measuring device, the first actuator may be configured to move the abutting plate.

Details of the technology disclosed herein will be described in the following "Detailed Description of Embodiments."

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
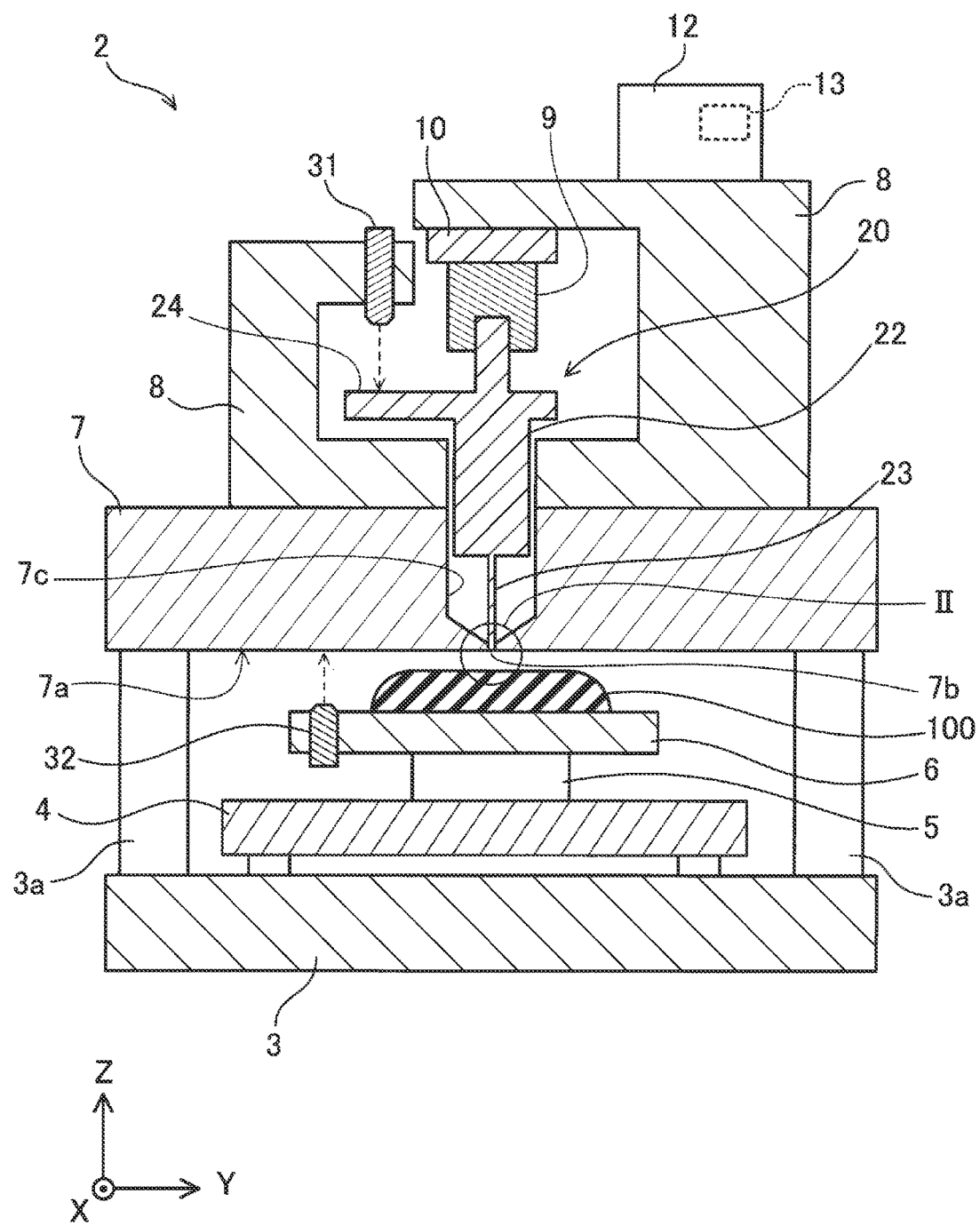
FIG. 1 is a schematic cross-sectional view of a surface pressure measuring device of an embodiment.
Figure 2:
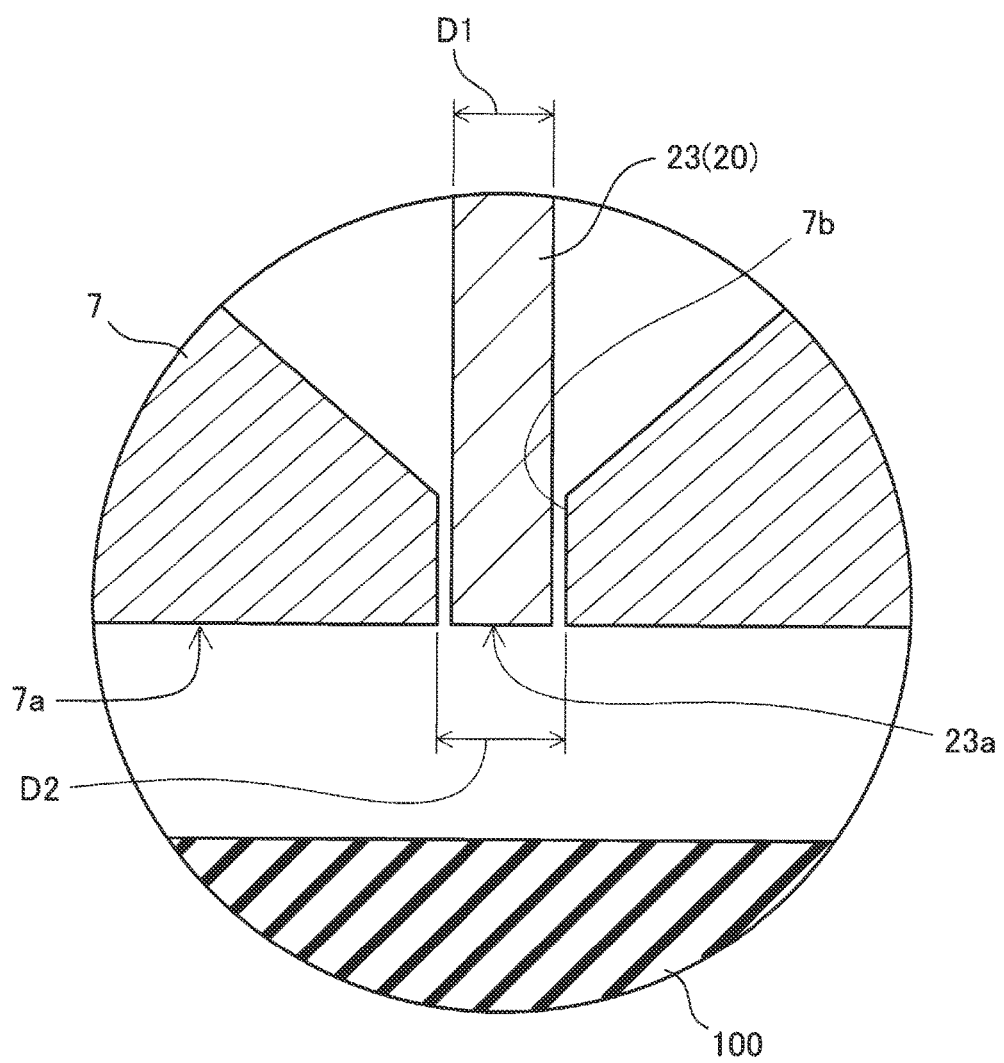
FIG. 2 is an enlarged cross-sectional view in a circle designated by reference numeral II of FIG. 1.

A surface pressure measuring device 2 of an embodiment will be described with reference to the accompanying drawings. FIG. 1 is a schematic cross-sectional view of the surface pressure measuring device 2. FIG. 2 is an enlarged view of a portion in a circle designated by reference numeral II in FIG. 1. The surface pressure measuring device 2 can measure a local surface pressure when a target 100 placed on a placing table 6 is compressed to a predetermined thickness. The target 100 is a gasket formed of, for example, an elastic material. The surface pressure measuring device 2 can measure a surface pressure distribution of the gasket (the target 100).

The surface pressure measuring device 2 includes a base 3, an XY stage 4, a lift 5, the placing table 6, an abutting plate 7, a probe 20, a load sensor 9, a piezo actuator 10, a controller 12, and two laser range finders 31 and 32. Further, in a coordinate system in the drawings, an X axis and a Y axis represent horizontal directions, and a Z axis represents a vertical direction.

The XY stage 4 is provided on the base 3. The lift 5 is attached onto the XY stage 4, and the placing table 6 is attached onto the lift 5. The target 100 is placed on the placing table 6. The XY stage 4 can move the lift 5 and the placing table 6 within a horizontal plane. As described below, the abutting plate 7 and the probe 20 configured to measure a surface pressure are disposed over the placing table 6 (over the target 100). A place of the target 100 abutting a tip surface 23a of the probe 20 corresponds to a surface pressure measurement place. The XY stage 4 can change a place of the target 100 that abuts the tip surface 23a of the probe 20. The XY stage 4 is an actuator configured to move the target 100 relative to the probe 20 to change an abutting place of the target 100 with the probe 20. The XY stage 4 is controlled by the controller 12.

The lift 5 is an actuator configured to move the placing table 6 vertically. The abutting plate 7 is disposed over the placing table 6. The abutting plate 7 is fixed to the base 3 by posts 3a. When the placing table 6 is raised by the lift 5, the target 100 comes in contact with a lower surface of the abutting plate 7. The lower surface of the abutting plate 7 is referred to as an abutting surface 7a hereinafter. The laser range finder 32 is attached to the placing table 6. The laser range finder 32 measures a distance from the surface of the placing table 6 to the abutting surface 7a, i.e., a distance between the placing table 6 and the abutting plate 7. Measurement data is transmitted to the controller 12. The controller 12 can freely change a distance between the placing table 6 and the abutting plate 7 using the lift 5 based on the measurement data of the laser range finder 32.

A pinhole 7b is formed in the abutting plate 7. A tip 23 of the probe 20 passes through the pinhole 7b. As shown in FIG. 2, the tip surface 23a of the probe 20 is exposed from the pinhole 7b at the abutting surface 7a side of the abutting plate 7.

The probe 20 includes the tip 23 having a small diameter, and an intermediate section 22 having a large diameter and following the tip 23. The intermediate section 22 is thicker than the tip 23. For example, a diameter D1 (see FIG. 2) of the tip 23 is 10 microns. A diameter of the intermediate section 22 is 2 mm. A diameter D2 of the pinhole 7b of the abutting plate 7 is, for example, 12 microns, and the tip 23 of the probe 20 is fitted into the pinhole 7b with a clearance of 1 micron.

The abutting plate 7 has a large diameter hole 7c that follows the pinhole 7b. A diameter of the large diameter hole 7c is much larger than the diameter of the pinhole 7b. The tip 23 of the probe 20 is inserted through the pinhole 7b, and the intermediate section 22 of the probe 20 is inserted through the large diameter hole 7c. In FIG. 1, while a gap is formed between the large diameter hole 7c and the intermediate section 22, a clearance between the large diameter hole 7c and the intermediate section 22 is also about 1 micron. A relative position of the probe 20 with respect to the abutting plate 7 in an XY plane in the drawings is determined by fitting of a large diameter hole 7c and the intermediate section 22. The relative position of the probe 20 with respect to the abutting plate 7 in the XY plane can be determined by the large diameter hole 7c and the intermediate section 22 without applying a load to the thin tip 23 of the probe 20.

The probe 20 has a rear end that is supported by the piezo actuator 10 with intervention of the load sensor 9. The piezo actuator 10 is supported by a support block 8 fixed onto the abutting plate 7. The piezo actuator 10 expands and contracts in a Z direction (an upward/downward direction) in the drawings. That is, the piezo actuator 10 can advance and retract the probe 20 in the upward/downward direction. In other words, the probe 20 is inserted to advance and retreat in the pinhole 7b by the piezo actuator 10. A vertical stroke of the piezo actuator 10 (a stroke of the probe 20) is about 100 microns. The probe 20 is supported such that the tip surface 23a is substantially flush with the abutting surface 7a of the abutting plate 7. As will be described below in detail, the controller 12 controls a position of the probe 20 in the upward/downward direction using the piezo actuator 10 such that the tip surface 23a is flush with the abutting surface 7a.

The laser range finder 31 is attached to the support block 8. The laser range finder 31 measures a position in the upward/downward direction of a flange 24 installed at a rear end of the probe 20. That is, the laser range finder 31 measures a position of the probe 20 in the upward/downward direction. The controller 12 stores the position of the flange 24 when the tip surface 23a is flush with the abutting surface 7a. The controller 12 controls the piezo actuator 10 such that the tip surface 23a of the probe 20 is always flush with the abutting surface 7a based on the measurement data of the laser range finder 31.

When the tip surface 23a of the probe 20 receives an upward load, the load sensor 9 is contracted and the probe 20 is slightly raised. The controller 12 expands the piezo actuator 10 such that the tip surface 23a of the probe 20 is flush with the abutting surface 7a. The load sensor 9 measures a load received when the tip surface 23a of the probe 20 is flush with the abutting surface 7a. Further, the controller 12 adjusts the measurement data of the load sensor when no load is applied to the tip surface 23a to a zero point upon starting of the surface pressure measuring device 2. The weight of the probe 20 is removed from a measured value of the load sensor in the zero-point adjustment. Accordingly, the controller 12 can accurately obtain the load received when the tip surface 23a of the probe 20 is flush with the abutting surface 7a from the measurement data of the load sensor 9.

A method of manufacturing a surface pressure of the target 100 by the surface pressure measuring device 2 will be described. The controller 12 controls the XY stage 4 such that a surface pressure measurement place of the target 100 is disposed immediately under the tip surface 23a of the probe 20. Next, the controller 12 controls the lift 5 such that the target 100 comes in contact with a range including the tip surface 23a of the abutting surface 7a. The controller 12 raises the placing table 6 using the lift 5 and compresses the target 100 to a predetermined thickness based on the measurement data of the laser range finder 32. That is, the controller 12 raises the placing table 6 using the lift 5 such that a gap between the placing table 6 and the abutting plate 7 is equal to a target thickness of the target 100.

Figure 3:
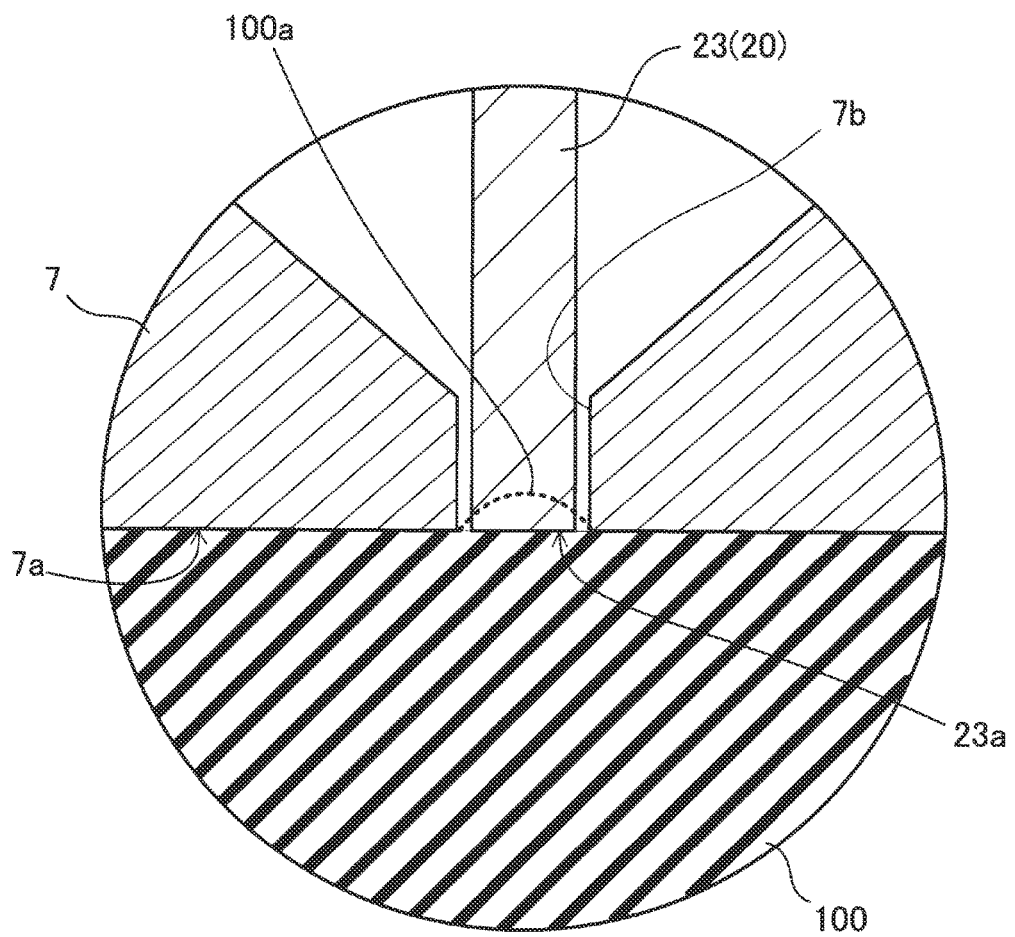
FIG. 3 is an enlarged cross-sectional view in the circle designated by reference numeral II of FIG. 1 (a state in which a target is pushed against an abutting plate)

When the target 100 abuts the abutting surface 7a, the surface pressure measurement place of the target 100 also abuts the tip surface 23a of the probe 20. The surface pressure measurement place of the target 100 adds a load to the probe 20 in an upward direction. The load sensor 9 in contact with the rear end of the probe 20 is contracted by the load. As described above, the controller 12 controls the piezo actuator 10 such that the tip surface 23a of the probe 20 is flush with the abutting surface 7a. FIG. 3 shows a state in which an upper surface of the target 100 is adhered to the abutting surface 7a of the abutting plate 7. If there is no probe 20, the surface pressure measurement place of the target 100 swells in the middle of the pinhole 7b (reference numeral 100a of FIG. 3). The probe 20 having the tip surface 23a that is flush with the abutting surface 7a pushes back the portion 100a that swells in the middle of the pinhole 7b of the target 100, and the surface of the target 100 is flattened. A repulsive force thereof is added to the probe 20. The piezo actuator 10 holds the tip surface 23a of the probe 20 to be flush with the abutting surface 7a as the probe 20 resists a repulsive force received from the target 100 while the lift 5 causes the target 100 to abut the abutting plate 7. The load sensor 9 detects the load at this time. The controller 12 calculates a surface pressure added to the tip surface 23a of the probe 20 from a measured value of the load sensor 9 and an area of the tip surface 23a of the probe 20. The surface pressure corresponds to a surface pressure of a surface pressure measurement place of the target 100. The controller 12 calculates a surface pressure of a place (a surface pressure measurement place) of the target 100 in contact with the tip surface 23a from the measurement data of the load sensor 9 and the area of the tip surface 23a of the probe 20 and stores the surface pressure in a storage device 13.

Advantages of the surface pressure measuring device 2 will be described. The abutting plate 7 in contact with the target 100 serving as a target for measuring a surface pressure has the pinhole 7b in the abutting surface 7a. The tip surface 23a of the probe 20 is exposed through the pinhole 7b. The tip surface 23a is flush with the abutting surface 7a. Since the tip surface 23a of the probe 20 is buried in the pinhole 7b, the abutting surface 7a presses the target 100 uniformly as if there were no pinhole 7b. Accordingly, the same surface pressure as when the flat abutting surface 7a with no pinhole 7b applies the load uniformly is generated in the surface of the target 100. Meanwhile, the load applied to the probe 20 buried in the pinhole 7b is measured by the load sensor 9. The load measured by the load sensor 9 corresponds to a local surface pressure of the target 100 when the flat abutting surface 7a is pressed uniformly. Even when the area of the tip surface 23a of the probe 20 is small, since the tip surface 23a is surrounded by the abutting surface 7a, a state in which the abutting surface 7a compresses the target uniformly is held. The surface pressure measuring device 2 can measure the local surface pressure when the target is compressed uniformly. The surface pressure measuring device 2 can measure a local microscopic surface pressure of the target surface as a size of the tip surface 23a of the probe 20 and an area of the pinhole 7b are reduced.

A clearance between the tip 23 of the probe 20 and the pinhole 7b and precision of "flushness" between the tip surface 23a of the probe 20 and the abutting surface 7a are determined depending on the measurement precision of the surface pressure. As the required measurement precision of the surface pressure is increased, the clearance is reduced and an allowable error in a degree of "flushness" between the tip surface 23a and the abutting surface 7a is reduced. When the required measurement precision of the surface pressure is low, the clearance may be correspondingly large and the allowable error in the degree of "flushness" between the tip surface 23a and the abutting surface 7a is also increased.

The surface pressure measuring device 2 can also measure the surface pressure distribution when the target 100 is compressed uniformly. The controller 12 changes an abutting place of the target 100 with the probe 20 using the XY stage 4 and measures a surface pressure of a new place. The controller 12 calculates surface pressures at a plurality of places of the target 100 and outputs a surface pressure distribution of the target 100 to the storage device 13.

Figure 4:
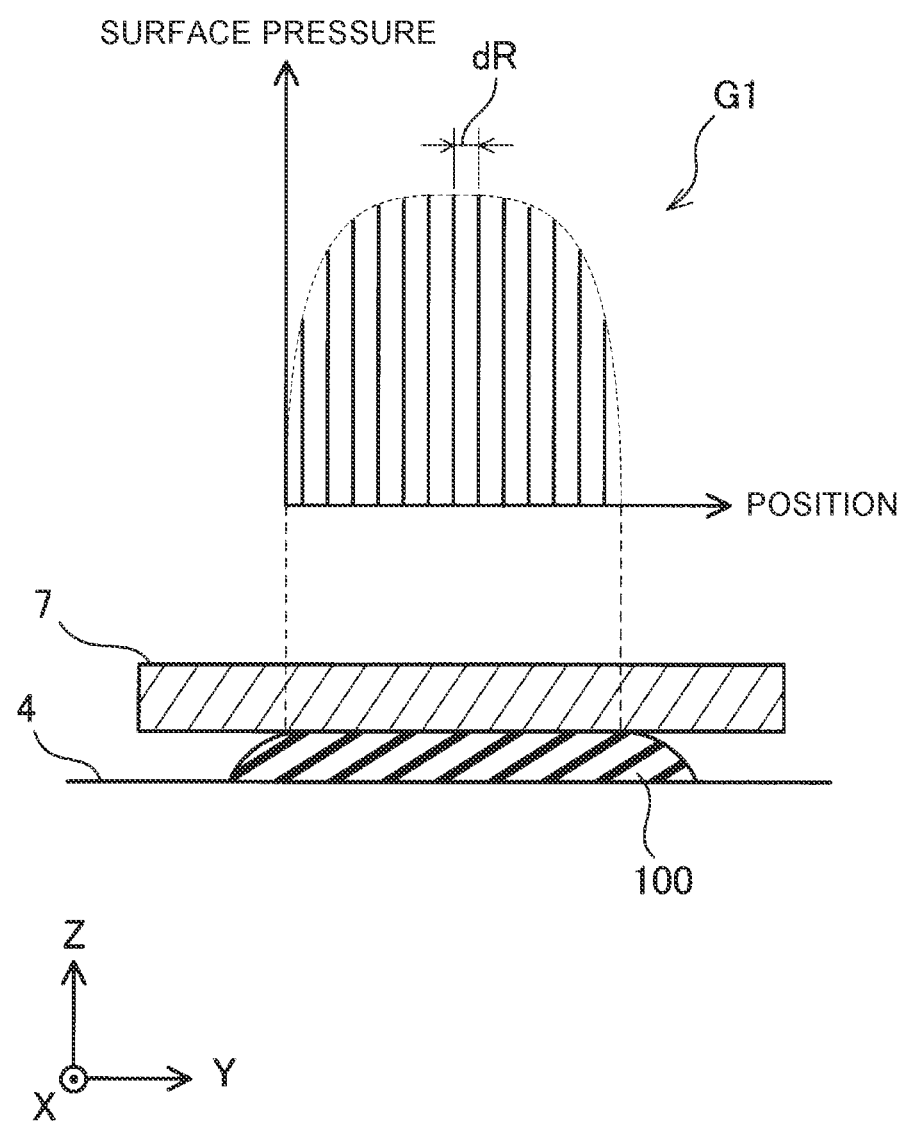
FIG. 4 is a graph showing a measurement example of a surface pressure distribution.

FIG. 4 shows an example of a measurement result of a surface pressure distribution. In a bar graph G1 of FIG. 4, a surface pressure distribution of the target 100 is shown in a Y direction of a coordinate system in the drawing. In FIG. 4, the pinhole 7b and the probe 20 are not shown. A position resolution dR of the surface pressure distribution depends on a diameter of the tip surface 23a of the probe 20 and a position resolution of movement of the XY stage 4. When both the diameter of the tip surface 23a and the position resolution of the XY stage are 10 microns, the position resolution dR of the surface pressure measurement of the surface pressure measuring device 2 is 10 microns.

Figure 5:
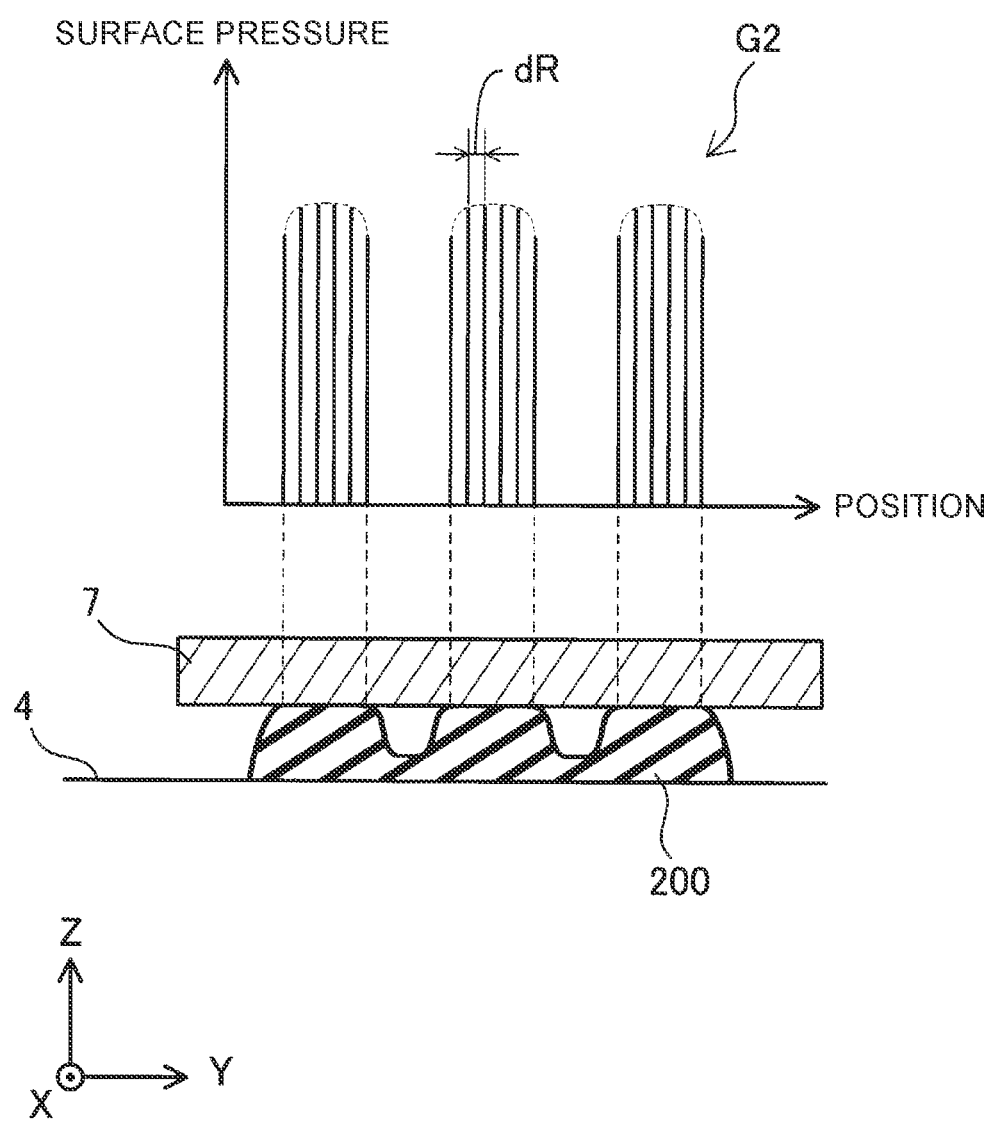
FIG. 5 is a graph showing another measurement example of a surface pressure distribution.

FIG. 5 shows an example of another measurement result of a surface pressure distribution. A bar graph G2 of FIG. 5 shows a surface pressure distribution of a target 200 in the Y direction of the coordinate system in the drawing. In FIG. 5, the pinhole 7b and the probe 20 are not shown. The target 200 is a gasket having three lips. Even in this example, the position resolution dR of the surface pressure distribution depends on the diameter of the tip surface 23a of the probe 20 and a position resolution of movement of the XY stage 4. When both the diameter of the tip surface 23a and the position resolution of the XY stage are 10 microns, the position resolution dR of the surface pressure measurement of the surface pressure measuring device 2 is 10 microns.

Items of consideration in the technology described in the embodiment will be described. The probe 20 includes the thin tip 23 and the intermediate section 22 having a large diameter and that continues to the tip 23. A strong probe can be realized while setting the tip surface 23a as a small area. In addition, the intermediate section 22 is fitted into the large diameter hole 7c formed to continue to the pinhole 7b. A position of the probe 20 in the XY plane is determined by fitting of the large diameter hole 7c and the intermediate section 22.

The surface pressure measuring device 2 of the embodiment can measure a local surface pressure in a state in which the target 100 is compressed to a predetermined thickness. The surface pressure measuring device 2 can measure a local surface pressure in a state in which a load having a predetermined magnitude is applied to the entire target 100. In this case, a load measurement sheet is sandwiched between the placing table 6 and the target 100. The controller 12 pushes the target 100 against the abutting plate 7 using the lift 5. The controller 12 pushes the target 100 against the abutting plate 7 such that the load received by the target 100 coincides with a predetermined target load based on the measurement data by the load measurement sheet. The controller 12 measures a local surface pressure of the target 100 using the probe 20 in this state. Further, when the stiffness of the entire target 100 is known, a unique relationship is established between the load applied to the target 100 and the thickness after compression. Accordingly, in this case, application of the predetermined load to the target is substantially equivalent to compression of the target 100 to the predetermined thickness.

The piezo actuator 10 holds a state in which the tip surface 23a of the probe 20 is flush with the abutting surface 7a while the lift 5 causes the target 100 to abut the abutting surface 7a. The piezo actuator 10 holds the state in which the tip surface 23a is flush with the abutting surface 7a from the beginning when the abutting surface 7a abuts the target 100. In other words, the lift 5 causes the target 100 to abut the abutting surface 7a while the piezo actuator 10 holds the state in which the tip surface 23a is flush with the abutting surface 7a. The controller 12 of the surface pressure measuring device 2 may control the lift 5 and the piezo actuator 10 in the following sequence instead of the above-mentioned sequence. The controller 12 stops supply of power to the piezo actuator 10 until the lift 5 is moved to compress the target 100 to a predetermined target thickness. Here, a portion of the target 100 pushes the probe 20 into the middle of the pinhole 7b. The controller 12 controls the piezo actuator 10 after the target 100 is compressed to the predetermined target thickness, and holds the state in which the tip surface 23a of the probe 20 is flush with the abutting surface 7a. After that, the controller 12 calculates a surface pressure of a place that abuts the tip surface 23a based on the measurement data of the load sensor 9. However, in the former sequence (the sequence in which the lift 5 causes the target 100 to abut the abutting surface 7a while the piezo actuator 10 holds the state in which the tip surface 23a is flush with the abutting surface 7a), the surface pressure measurement precision is expected to increase.

In the case of the surface pressure measuring device 2 of the embodiment, the target 100 (the placing table 6) is moved to change a relative position of the target 100 with respect to the probe 20. Reversely, the abutting plate 7 including the probe 20 may be moved to change the relative position.

The surface pressure measuring device 2 of the embodiment sandwiches the target 100 with the flat placing table 6 and the abutting plate 7 having the flat abutting surface 7a. The surface pressure measuring device may employ a cylindrical abutting plate, and a columnar placing table (attachment column) with a variable diameter. When such an abutting plate and such an attachment column are employed, a local surface pressure can be measured in a state in which the entire ring-shaped shaft seal gasket is compressed. Specifically, the ring-shaped shaft seal gasket is attached to the attachment column with the variable diameter. The attachment column attached to the gasket enters the cylindrical abutting plate. The diameter of attachment column is enlarged and the gasket is uniformly compressed. In this state, a local surface pressure of the gasket is measured using the probe exposed from the pinhole of the abutting plate.

The pinhole 7b of the embodiment and the large diameter hole 7c that is continuous therefrom correspond to "a hole provided in an abutting plate" of the claims. The pinhole 7b corresponds to an example of "a small diameter section" of the claims, and the large diameter hole 7c corresponds to an example of "a large diameter section" of the claims. The lift 5 of the embodiment corresponds to an example of "a first actuator" of the claims. The piezo actuator 10 of the embodiment corresponds to an example of "a second actuator" of the claims. The XY stage 4 of the embodiment corresponds to an example of "a third actuator" of the claims. The first actuator may function as the third actuator. For example, a stage (an XYZ stage) capable of moving a table two-dimensionally may function as the first actuator and the third actuator. The laser range finder 31 of the embodiment corresponds to an example of "a first laser range finder" of the claims. The laser range finder 32 of the embodiment corresponds to an example of "a second laser range finder" of the claims.

The third actuator may be an XY stage using a ball screw or may be an actuator configured to move a placing table two-dimensionally using a link mechanism.

While specific examples of the present disclosure have been described above, these are merely exemplary and do not limit the scope of the claims. Various modifications and variations of the specific examples exemplified above are included in the technology disclosed in the claims. Technical components described in the specification or the drawings exhibit technical usefulness alone or in various combinations, but do not limit the combinations of the claims at the time the application is filed. In addition, the technology disclosed in the specification or the drawings can achieve a plurality purposes at the same time and has technical usefulness by itself by achieving one of the purposes.

What is claimed is:

1. A surface pressure measuring device configured to measure a local surface pressure of a surface of a target, the surface pressure measuring device comprising:
    an abutting plate configured to abut the target and including a hole in an abutting surface that abuts the target;
    a probe having a tip surface to be exposed at an abutting surface side and configured to be movably inserted through the hole of the abutting plate in an axial direction of the hole;
    a first actuator configured to cause the target to abut the abutting surface with a predetermined load or configured to cause the target to abut the abutting surface such that the target is compressed to a predetermined thickness;
    a second actuator configured to support the probe and to hold a state in which the tip surface of the probe is flush with the abutting surface as the probe resists a repulsive force received from the target while the first actuator causes the target to abut the abutting surface;
    a load sensor configured to measure a load applied to the probe when the second actuator holds the state in which the tip surface of the probe is flush with the abutting surface; and
    a controller configured to calculate a surface pressure applied to the tip surface of the probe from a measured value of the load sensor and an area of the tip surface of the probe.

2. The surface pressure measuring device according to claim 1, further comprising:
    a third actuator configured to move the abutting plate relative to the target to change a place at which the target abuts the probe,
    wherein the controller calculates the surface pressure at a plurality of places of the target and outputs a surface pressure distribution of the target.

3. The surface pressure measuring device according to claim 1, wherein the probe includes a tip and an intermediate section thicker than the tip, and
    the hole includes a small diameter section through which the tip of the probe is inserted, and a large diameter section having a diameter larger than a diameter of the small diameter section and through which the intermediate section is inserted.

4. The surface pressure measuring device according to claim 1, further comprising:
    a laser range finder configured to measure a position of the probe in the axial direction of the hole,
    wherein the controller stores the position of the probe in the axial direction of the hole when the tip surface is flush with the abutting surface, and controls the second actuator such that the tip surface is flush with the abutting surface based on measurement data of the laser range finder.

5. The surface pressure measuring device according to claim 1, further comprising:
    a placing table placed on the target,
    wherein the first actuator is configured to move the placing table.

6. The surface pressure measuring device according to claim 5, further comprising:
    a laser range finder installed on the placing table and configured to measure a distance between the placing table and the abutting plate,
    wherein the controller acquires measurement data measured by the laser range finder and controls the first actuator to change the distance between the placing table and the abutting plate based on the measurement data measured by the laser range finder.

7. The surface pressure measuring device according to claim 1, wherein the first actuator is configured to move the abutting plate.

* * * * *